(12) United States Patent
Vasantham et al.

(10) Patent No.: US 10,825,078 B2
(45) Date of Patent: *Nov. 3, 2020

(54) SYSTEM AND METHOD FOR ROUTING ORDER LOOKUPS FROM RETAIL SYSTEMS

(71) Applicant: Walmart Apollo, LLC, Bentonville, AR (US)

(72) Inventors: Madhavan Kandhadai Vasantham, Foster City, CA (US); Mahesh Tyagarajan, San Jose, CA (US); Sreekanth Sreedhararaj, Foster City, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 207 days.

This patent is subject to a terminal disclaimer.

(21) Appl. No.: 16/121,424

(22) Filed: Sep. 4, 2018

(65) Prior Publication Data
US 2019/0019241 A1 Jan. 17, 2019

Related U.S. Application Data

(63) Continuation of application No. 14/231,207, filed on Mar. 31, 2014, now Pat. No. 10,068,281.

(51) Int. Cl.
*G06Q 30/00* (2012.01)
*G06Q 30/06* (2012.01)
*G06Q 50/00* (2012.01)

(52) U.S. Cl.
CPC ......... *G06Q 30/0635* (2013.01); *G06Q 50/01* (2013.01)

(58) Field of Classification Search
CPC .............. G06Q 30/0635; G06Q 50/01; G06F 16/24552; G06F 16/334
See application file for complete search history.

(56) References Cited

U.S. PATENT DOCUMENTS 6,272,948 B1   8/2001 Klippert
6,728,948 B1   4/2004 Baxter et al.
(Continued)

OTHER PUBLICATIONS

Datta, Anindya; Dutta, Kaushik; Thomas, Helen; VanderMeer, Debra; World Wide Wiat: A Study of Internet Scalability and Cache-Based Approaches to Alleviate It, Management Science; Oct. 2003; 49,10; ProQuest Central, p. 1425 (Year: 2003).*

(Continued)

*Primary Examiner* — Matthew E Zimmerman
(74) *Attorney, Agent, or Firm* — Bryan Cave Leighton Paisner LLP (57) ABSTRACT

The present invention is generally directed to methods, systems, and computer program products for routing order lookups from retail systems. Order data can be synchronized from the order database cache to the order database. The order database can modify an order state of one or more customer orders from the order database. An order lookup can be received from an in-store retail system channel of one or more in-store retail system channels and can indicate a database command type. A database command type can impact a state of the order database when the order data is modified. A data source can service the order lookup based on at least a timestamp of the order data associated with a customer order. A data indicator of the order data in the order lookup can be modified when the database command type impacts the state of the order database.

20 Claims, 7 Drawing Sheets

(56) References Cited

U.S. PATENT DOCUMENTS

| | | |
|---|---|---|
| 7,318,043 B1 | 1/2008 | Silver et al. |
| 7,698,170 B1 | 4/2010 | Darr et al. |
| 8,495,487 B2 | 7/2013 | Jerome |
| 8,615,439 B2 | 12/2013 | Ramaratnam et al. |
| 9,489,425 B2 | 11/2016 | Vasantham et al. |
| 2002/0007321 A1 | 1/2002 | Burton |
| 2002/0055878 A1 | 5/2002 | Burton |
| 2002/0143655 A1 | 10/2002 | Elston |
| 2003/0018513 A1 | 1/2003 | Hoffman |
| 2004/0015386 A1 | 1/2004 | Abe |
| 2004/0019494 A1 | 1/2004 | Ridgeway |
| 2005/0050067 A1* | 3/2005 | Sollicito ............... H04L 69/329 |
| 2006/0011720 A1 | 1/2006 | Call |
| 2006/0085250 A1 | 4/2006 | Kantarjiev et al. |
| 2006/0212361 A1 | 9/2006 | Perkowski |
| 2006/0250248 A1 | 11/2006 | Tu |
| 2007/0233580 A1 | 10/2007 | Pike |
| 2007/0260591 A1 | 11/2007 | Ahi |
| 2008/0294996 A1 | 11/2008 | Hunt |
| 2009/0019003 A1 | 1/2009 | Bohannon |
| 2009/0026255 A1* | 1/2009 | Besecker ............ G06Q 20/208 235/375 |
| 2009/0031232 A1 | 1/2009 | Brezina |
| 2009/0198536 A1 | 8/2009 | Hamilton, II |
| 2009/0254337 A1 | 10/2009 | Sprecher |
| 2009/0276449 A1 | 11/2009 | Syed |
| 2011/0218842 A1 | 9/2011 | Addala et al. |
| 2011/0258079 A1 | 10/2011 | Ngan |
| 2012/0084178 A1 | 4/2012 | Ehbauer et al. |
| 2012/0089700 A1 | 4/2012 | Safruti |
| 2012/0095874 A1 | 4/2012 | Bruno |
| 2012/0143666 A1 | 6/2012 | Carrion et al. |
| 2012/0226595 A1 | 9/2012 | Torres |
| 2012/0226612 A1 | 9/2012 | Kurtis |
| 2012/0265671 A1 | 10/2012 | Higgins |
| 2012/0278242 A1 | 11/2012 | Griffith |
| 2013/0085984 A1 | 4/2013 | Burger |
| 2013/0151381 A1 | 6/2013 | Klein |
| 2013/0151491 A1 | 6/2013 | Gislason |
| 2013/0173402 A1 | 7/2013 | Young |
| 2013/0204697 A1 | 8/2013 | Boal |
| 2013/0211870 A1 | 8/2013 | Lawson |
| 2013/0211967 A1 | 8/2013 | Ogilvy |
| 2013/0218589 A1 | 8/2013 | Lerner |
| 2013/0218716 A1 | 8/2013 | Godsey |
| 2013/0222116 A1 | 8/2013 | Barry, III |
| 2013/0282466 A1 | 10/2013 | Hampton |
| 2013/0290234 A1 | 10/2013 | Harris |
| 2013/0297458 A1 | 11/2013 | Van de Capelle |
| 2013/0311315 A1 | 11/2013 | Zises |
| 2013/0318152 A1 | 11/2013 | Iyer |
| 2013/0332488 A1 | 12/2013 | Christy |
| 2013/0346380 A1* | 12/2013 | Dong ..................... G06F 16/23 707/705 |
| 2014/0025535 A1 | 1/2014 | Douglas et al. |
| 2014/0052750 A1 | 2/2014 | Ciabrini |
| 2015/0278321 A1 | 10/2015 | Vasantham et al. |
| 2015/0278923 A1 | 10/2015 | Vasantham et al. |

OTHER PUBLICATIONS

Datta, Anindya; Dutta, Kaushik; Thomas, Helen; VanderMeer, Debra; World Wide Wiat: A Study of Internet Scalability and Cache-Based Approaches to Alleviate It, Management Science; Oct. 2003; 49, 10; ProQuest Central, p. 1425 Oct. 2003.

* cited by examiner

SYSTEM AND METHOD FOR ROUTING ORDER LOOKUPS FROM RETAIL SYSTEMS

CROSS-REFERENCE TO RELATED APPLICATIONS

This application is a continuation of U.S. application Ser. No. 14/231,207, filed Mar. 31, 2014. U.S. application Ser. No. 14/231,207 is incorporated herein by reference in its entirety.

BACKGROUND

Field of the Invention

This invention relates generally to the field of looking up database data, and, more particularly, to methods, systems, and computer program products for routing order lookups for order data.

Related Art

Retailers often maintain an order database of customer orders. When a customer orders or purchases one or more products, a corresponding order record can be created and stored in the order database. Customer orders can include various different types of order data, such as, for example, an order number, date/time of order, list of items purchased, cost of items purchased, quantity of items purchases, shipping method, a customer number, order status (e.g., pending, processed, shipped, etc.). Looking up their current and past orders is very important to customers. Thus, retailers typically allow customer access to an order database so that customers can view information about their orders. For example, through a website or mobile application a customer can query an order database for information about their orders. The order database can receive a query, identify one or more orders satisfying the query, and return the identified one or more orders to the client.

For some retailers, customer order database queries place a significant burden on order database resources. The resources consumed responding to customer queries can result in slower response to times for all customers. Slower response times can having a negative impact on the buying experience and, if response times are to slow, may cause a retailer to lose customers. That is, if response times are to slow, a prospective customer may be become impatient and/or frustrated and look for items elsewhere.

When buying online (e.g., through electronic commerce, mobile commerce, and social commerce environments), customers typical interact with a retailer through a graphical user interface (e.g., a website). The graphical user interface (can sit on top of, for example, a product database and) allows customers to browse and order items. When an order process is complete, a retailer can provide an order link for an order to the customer. The order link can then be selected to access order data corresponding to the order.

Thus, upon completion of an order, some customers may immediately and repeatedly start selecting the order link (e.g., clicking with a mouse) until order data is returned. Each time the order link is selected, a new query can be issued to the database for corresponding order data. The frequency of selecting the link may be much faster than the order database can respond. As such, multiple redundant queries can be issued for the same order data. The order database processes the redundant queries and returns multiple copies of the order data. Since many of the queries are redundant, order database resources are unnecessarily consumed.

Redundant queries can further deplete available order database resources, making it even more difficult to provide reasonable response times to all customers.

BRIEF DESCRIPTION OF THE DRAWINGS

The specific features, aspects and advantages of the present invention will become better understood with regard to the following description and accompanying drawings where.

DETAILED DESCRIPTION

The present invention extends to methods, systems, and computer program products for routing order lookups from retail systems.

In the following description of the present invention, reference is made to the accompanying drawings, which form a part hereof, and in which is shown by way of illustration specific embodiments in which the invention is may be practiced. It is understood that other embodiments may be utilized and structural changes may be made without departing from the scope of the present invention.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, kiosks, Point-Of-Sale ("POS") terminals, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

The present invention is generally directed to routing order lookups from retail systems. Embodiments of the invention facilitate more efficient order lookups of order detail data from an order management system database. Order data for an order can be entered into an order management system database from any of a variety of communication channels including but not limited to: electronic commerce, mobile commerce, social commerce, retail kiosks, Point-Of-Sale ("POS") terminals, etc. Order data from the order management system database is synchronized to an order cache. In some embodiments, the order management system database feeds the order cache with the latest updates on orders as relevant state for orders changes. The order cache stores order objects in and attribute-value pair (e.g., a JavaScript Object Notation ("JSON") format.

When an order lookup is received, a business layer determines if the cache can appropriately service the order lookup. If so, the business layer routes the order lookup to the cache. Otherwise, the business layer routes the order lookup to the order management system database. In some embodiments, order lookups configured to impact state of the order management system database (e.g., that write or change order data) are routed to the order management system database. In these same embodiments, order lookups configured to not impact state of the order management system database (e.g., that read order data) are routed to the cache.

Many different types of order lookups do not impact state. Routing these types of order lookups to the order cache reduces resource consumption at the order management system database. In turn, resources are freed up so that order lookups having a state impact can be more efficiently serviced at the order management system database. Routing order lookups that do not impact state to the cache (as opposed to the order management system database) also facilitates more efficient servicing of these order lookups.

In some embodiments, retail systems, such as, for example, retail kiosks and POS terminals are configured to permit order lookups. Thus, a customer, retail employee, or retail agent in a physical store location can (possibly after logging in) submit an order lookup to the order management system database. Using retail systems for order lookups allows a customer to review their current, recent, and historical orders in a physical store location. For example, a customer can submit one or more orders through a retailer's website or mobile application. The customer can then view the one or more orders in a physical store location, for example, at a retail kiosk or at a POS terminal (possibly with assistance from a store employee). Knowing order details for other orders can assist the customer with in-store purchasing decisions.

Figure 1:
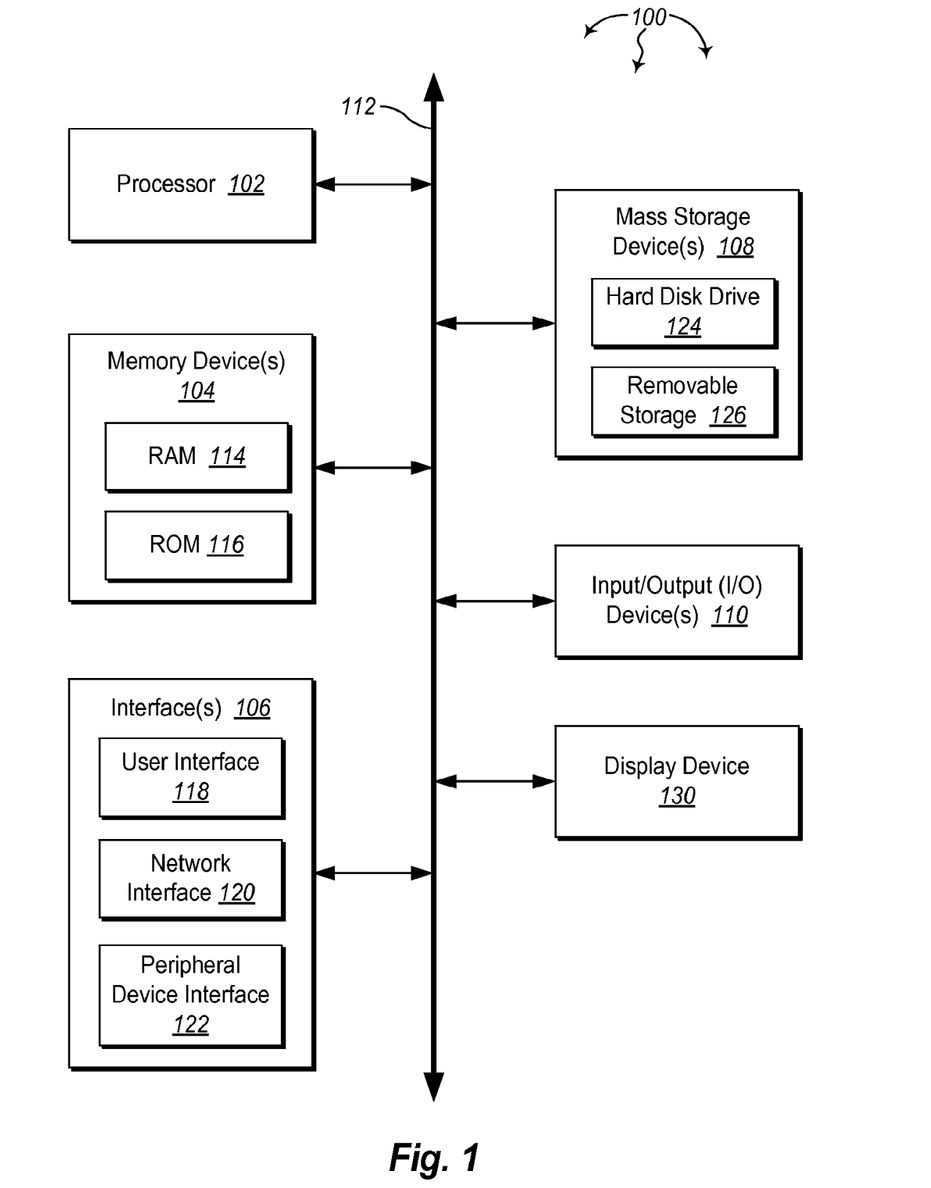
FIG. 1 illustrates an example block diagram of a computing device.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
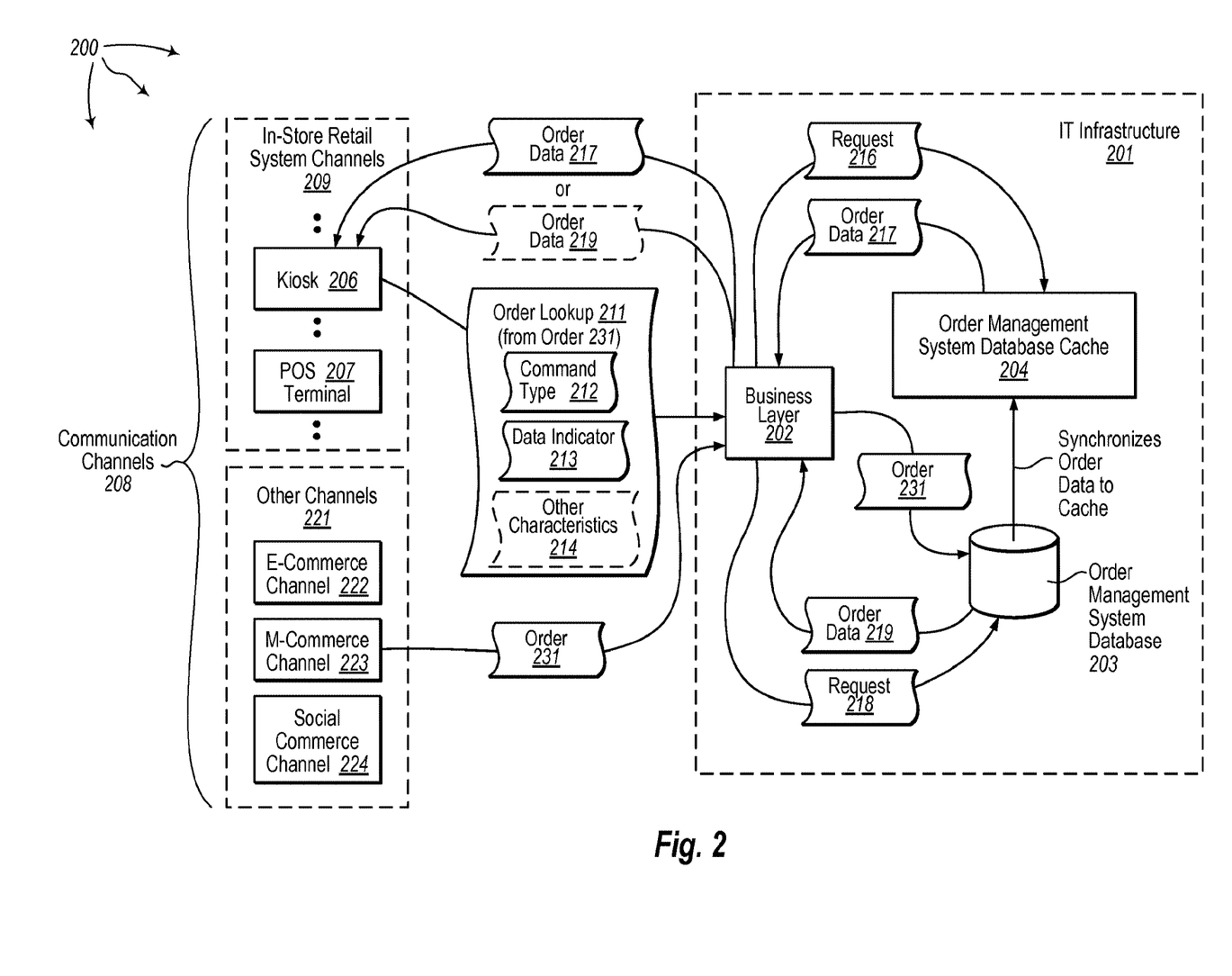
FIG. 2 illustrates an example computer architecture that facilitates routing order lookups from retail systems.

FIG. 2 illustrates an example computer architecture 200 that facilitates routing order lookup requests from retail systems. As depicted, computer architecture 200 includes Information Technology ("IT") infrastructure 201 and communication channels 208. IT infrastructure 201 and communication channels 208 can be connected to (or be part of) a network, such as, for example, a PAN, a LAN, a WAN, and even the Internet. IT infrastructure 201 and communication channels 208 can also be connected to a variety of other systems over the network. Accordingly, IT infrastructure 201 and communication channels 208, as well as any other connected computer systems and their components, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

IT infrastructure 201 can be associated with (and potentially owned by) a retail business entity. As such, IT infrastructure 201 can be connected to or include a Point-Of-Sale ("POS") system for the retail business entity. IT infrastructure 201 can also be connected to or include one or more of electronic commerce (e-commerce), mobile commerce (m-commerce), and social commerce modules for the retail business entity. Using a POS system or commerce module, a customer can perform a variety of retail related operations, including purchase items, order items, return items, track orders, track items, access order details, update order details, etc.

As depicted, IT infrastructure 201 further includes business layer 202, order management system database 203, and order management system database cache 204. Order management system ("OMS") database 203 can store order details for customer orders. From time to time, at specified intervals, or in response to designated triggers, OMS database 203 can synchronize order data to OMS database cache 204. As such, OMS database cache 204 can also store order details for customer orders. An order detail for an order can include, for example, one or more of: an order number, date/time of order, list of items purchased, cost of items purchased, quantity of items purchased, shipping method, tracking number, customer number, and order status. Order status can be, for example, order created, order in process, order being fulfilling, order shipped, order delivered, order return created, order return received and order return processed.

OMS database 203 and OMS database cache 204 can store order details in different formats. For example, OMS database 203 can store order details in a relational database management system ("RDBMS") format and OMS database cache 204 can store order details in other formats based on attribute-value pairs. These other formats include JavaScript Object Notation ("JSON") and eXstensible Markup Language ("XML"). Thus, synchronizing order details from OMS database 203 to OMS database cache 204 can include converting order details from an RDBMS format to a format based on attribute-value pairs. Use of attribute-value pair formats helps ensure that order lookups entered through a website or mobile application are efficiently serviced.

Business layer 202 is configured to route order lookups to an appropriate data source to service the order lookups. In some embodiments, business layer 202 can route order lookups that change order state to OMS database 203 and can route order lookups that do not change order state to OMS database cache 204. For example, an order lookup requesting a change to the quantity of a purchased item can be routed to OMS database 203. On the other hand, an order lookup requesting order numbers for all orders in the last three months can be routed to OMS database cache 204. Business layer 202 can also consider other characteristics, such as, for example, whether an order detail has yet been synchronized, time since order creation, etc., when routing order lookups.

As depicted, communication channels 208 including in-store retail channels 209 and other channels 221. In-store retail channels 209 include kiosk 206 and Point-Of-Sale (POS) terminal 207. Other channels 221 include e-commerce (e.g., web) channel 222, m-commerce (mobile) channel 223, and social commerce channel 224. Any of communication channels 208 send order lookups to IT infrastructure 201. Order lookups can be sent from communication channels 208 on the behalf of a customer (of the retail business entity). An order lookup can be sent by a customer on their own behalf. For example, a customer can login to a website or mobile application of the retail business entity. The customer can then submit an order lookup through appropriate (e.g., graphical user) interfaces. Alternately, an employee or agent of the retail business entity, for example, in a physical store location or through customer service, can submit an order lookup on behalf of a customer. For example, an in store employee can submit an order lookup for a customer through a POS terminal.

An order lookup sent from a communication channel 208 may or may not request a change to the state of OMS database 203. As described, business layer 202 can receive an order lookup and route the order lookup to an appropriate data source to service the order lookup. Indicated order data responsive to an order lookup can be identified at and gathered from the appropriate data source. Subsequently, in response to the order lookup, IT infrastructure 201 can return the indicated order data. For example, if a customer requests a list of their orders having a purchase price over $100, IT infrastructure 201 can return a list of order numbers for orders having a purchase price over $100. If customer requests that an order be canceled, IT infrastructure 201 can return an indication that the order has been canceled.

Figure 3:
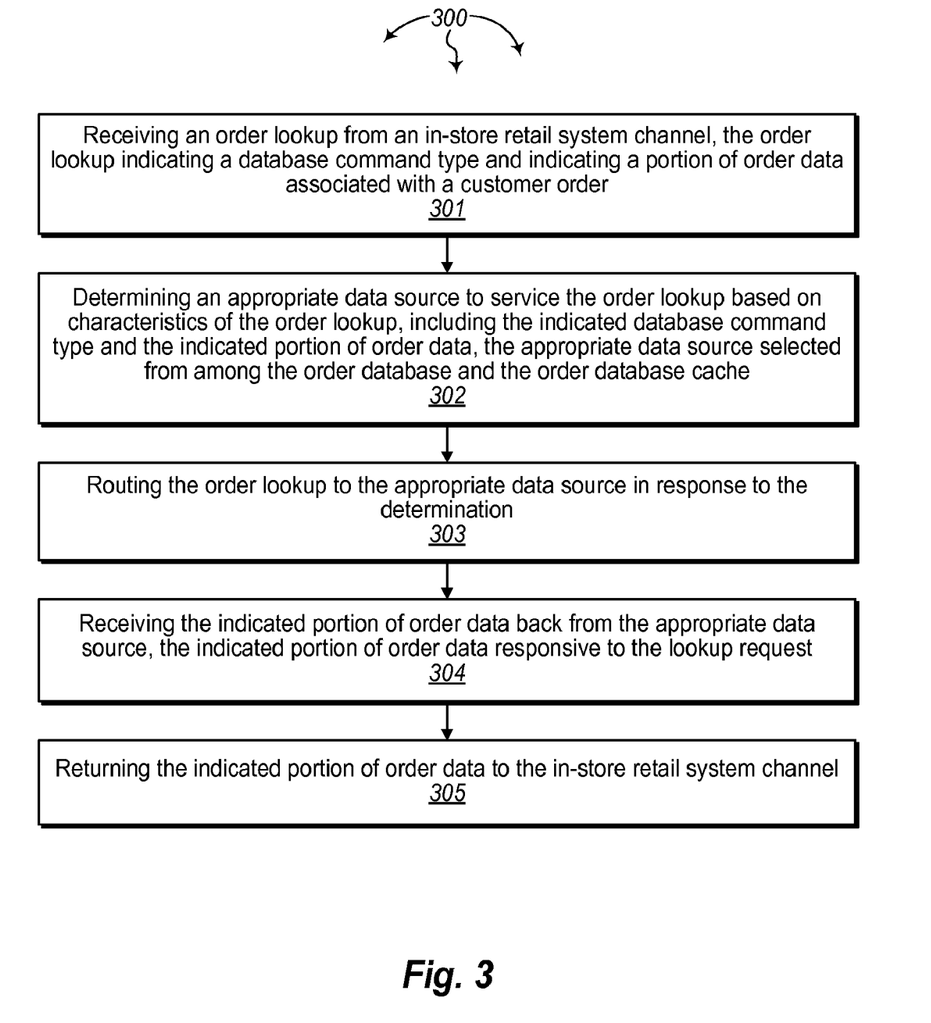
FIG. 3 illustrates a flow chart of an example method for routing order lookups from retail systems.

FIG. 3 illustrates a flow chart of an example method 300 routing order lookups form retail systems. Method 300 will be described with respect to the components and data of computer architecture 200.

A customer can use m-commerce channel 223 (e.g., a mobile application) for the retail business entity to submit new order 231 to IT infrastructure 201. Business layer 202 can receive order 231. Business layer 202 can determine that order 231 is a new order and, thus modifies state of OMS database 203. As such, business layer can route order 231 to OMS database 203. OMS database 203 can receive and store order 231. Subsequently, order 231 can be synchronized form OMS database 203 to OMS database cache 204.

At some later time, the customer can enter a store location of the retail business entity. In-store retail system channels 209 can be used to view order 231 while in the customer is in the store location. For example, either the customer or a store employee can use kiosk 206 to submit order lookup 211 to IT infrastructure 201.

Method 300 includes receiving an order lookup from an in-store retail system channel, the order lookup indicating a database command type and indicating a portion of order data associated with a customer order (301). For example, IT infrastructure 201 can receive order lookup 211 from kiosk 206. Order lookup 211 includes command type 212 and data indicator 213. Order lookup 211 can also include other characteristics 214.

In general, command type 212 can indicate a command that either does impact the state of OMS database 203 or does not impact the state of OMS database 203. Commands that do impact the state of OMS database 203 include but are not limited to commands that create an order, commands that cancel an order, or commands that add, delete, or change values in order data (e.g., item quantities, a shipping addresses, etc.) Commands that do not impact of the state of OMS database 203 include but are not limited to commands that read order data.

Data indicator 213 indicates portions of one or more order details that are of interest to the customer, such as, for example, order number(s), date/time of order(s), list(s) of items purchased, cost(s) of items purchased, item(s) quantity, shipping method(s), tracking number(s), customer number, and order(s) status. Order status can be, for example, order created, order in process, order being fulfilling, order shipped, order delivered, order return created, order return received and order return processed.

Other characteristics 214 can indicate other characteristics of order lookup 211, such as, for example, a time stamp indicating order lookup 211 was issued.

Method 300 includes determining an appropriate data source to service the order lookup based on characteristics of the order lookup, including the indicated database command type and the indicated portion of order data, the appropriate data source selected from among the order database and the order database cache (302). For example, business layer 202 can determine if OMS database 203 or OMS database cache 204 is the appropriate data source to service order lookup 211. Business layer 211 can determine the appropriate data source from command type 212, and data indicator 213 (and when appropriate other characteristics 214). For example, if command type 212 indicates a command that is configured to impact state (e.g., a change to order 231), business layer 211 can determine that OMS database 203 is the appropriate data source to service order lookup 211. On the other hand, if command type 212 indicates a command that is configured to not impact state (e.g., reading data form order 231), business layer 211 can determine that OMS database cache 204 is the appropriate data source to service order lookup 211.

When order data indicated by data indicator 213 has not yet been synchronized to database cache 204 (or for other reasons), business layer 202 can determine that OMS database 203 is the appropriate data source to service order lookup 211 (even when command type 212 indicates a command that is configured to not impact state). Business layer 202 can consider other characteristics 214, such as, for example, a time stamp, and/or other timing related data when determining if and when indicated data has or has not been synchronized from synchronized to for OMS database 203 to OMS database cache 204.

Business layer 202 can process order request 211 to formulate a corresponding request in a format compatible with the determined appropriate data source. For example, if OMS database 203 is the determined data source, business layer 202 can formulate request 218 (e.g., an RDBMS query) from order request 211. On the other hand, if OMS database cache 204 is the determined data source, business layer 202 can formulate request 216 (e.g., a request for JSON data) from order request 211.

Method 300 includes routing the order lookup to the appropriate data source in response to the determination (303). For example, when the appropriate data source is OMS database cache 204, business layer 202 can route request 216 (e.g., to read data form order 231) to OMS database cache 204. On the other hand, when the appropriate data source is OMS database 203, business layer 202 can route request 218 (e.g., to write data to order 231) to OMS database 203.

Method 300 includes receiving the indicated portion of order data back from the appropriate data source, the indicated portion of order data responsive to the lookup request (304). For example, OMS database cache 204 can return order data 217 (data read from order 231) to business layer 202 in response to request 216. Order data 217 can include of the described order data for one or more order details. Alternately, OMS database 203 can return order data 219 (data updated in order 231) to business layer 202 in response to request 218. Order data 219 can include the described order data for one or more order details.

Method 300 includes returning the indicated portion of order data to the requesting computer system (305). For example, IT infrastructure can return order data 217 or order 219 to kiosk 206 in response to order lookup 211 as appropriate.

In some embodiments, the functionality of business layer 202 is provided in a kiosk or POS terminal. Thus, the kiosk or POS terminal can determine to route an order lookup to an OMS database or a corresponding OMS data cache.

Figure 4:
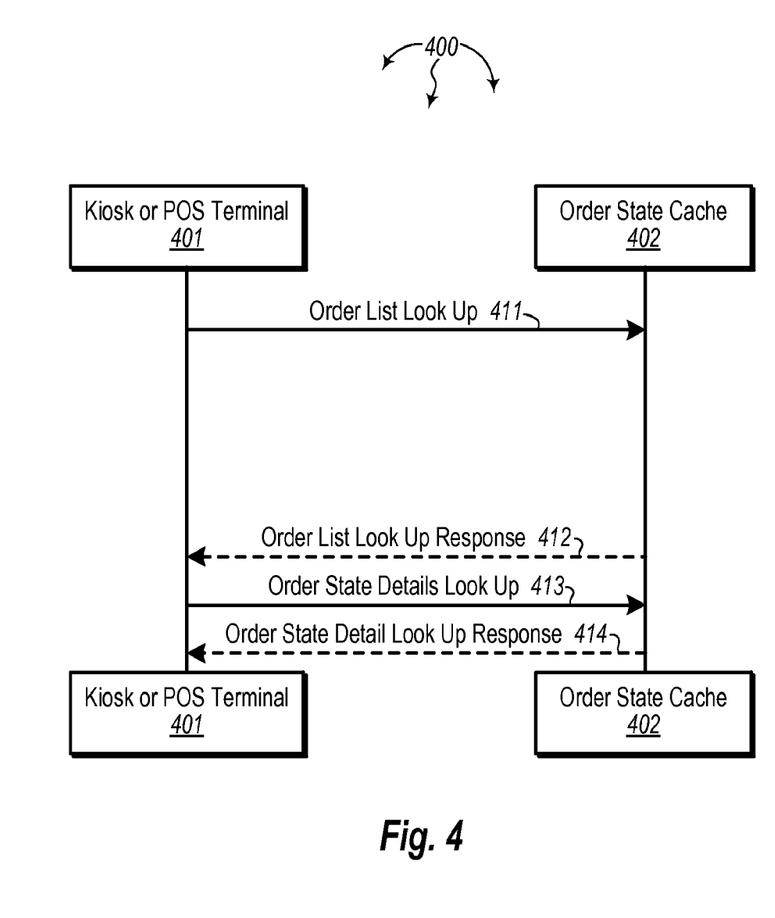
FIG. 4 illustrates a sequence diagram of an example for processing related order lookups from a retail system.

FIG. 4 illustrates a sequence diagram 400 of an example for processing related order lookups from a retail system. From kiosk or POS terminal 401, a customer can route order list lookup 411 to order state cache 402. Order state cache 402 (which is similar to OMS database cache 204) can return order list lookup response 412, for example, a list of order numbers, back to kiosk or POS terminal 401. As described, order detail for an order can be stored as JSON formatted data. Thus, the list of order numbers can be retrieved from within JSON formatted data for a corresponding plurality of orders stored in order state cache 402. For each order, an order number can be accessed from corresponding JSON data without having to return the entire order detail.

The customer can review the list of order numbers through (e.g., a graphical user) interface at kiosk or POS terminal 401. The customer can request additional order detail for a subset of one or more orders identified in the list order numbers. The customer can select a corresponding subset of one or more order numbers form the list of order numbers. From kiosk or POS terminal 401, the customer can route order state details lookup 413 to order state cache 402. Order state details lookup 413 can request further order detail data for the selected subset of one or more orders. Order state cache 402 can return order state detail lookup response 414 to kiosk or POS terminal 401. Order state detail lookup response 414 can include the requested additional order detail (e.g., other JSON formatted data) for the subset of one or more orders.

Figure 5:
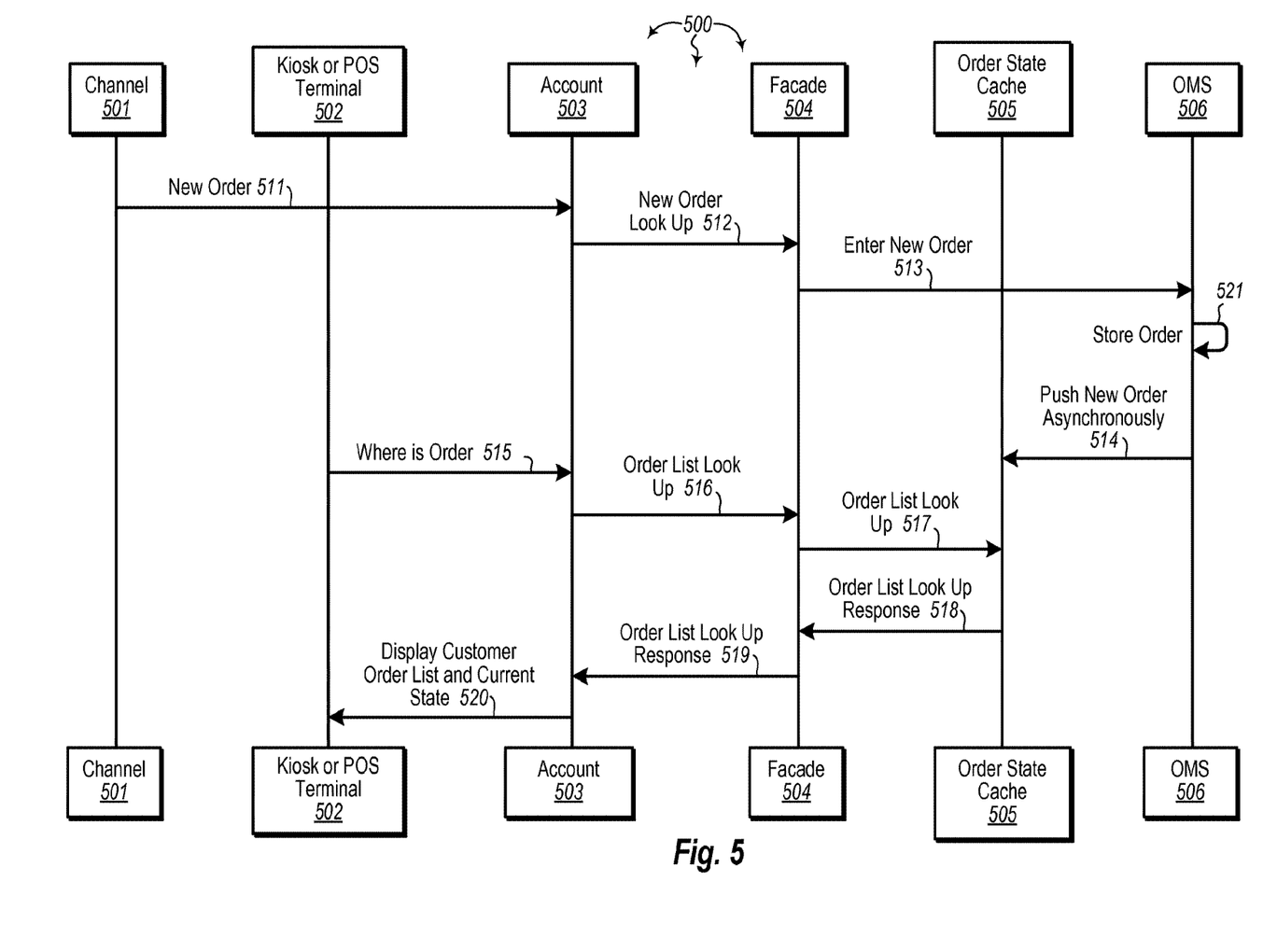
FIG. 5 illustrates a sequence diagram of an example for processing an order lookup from a retail system.

FIG. 5 illustrates a sequence diagram 500 of an example for processing an order lookup from a retail system. A user of channel 501 (e.g., an e-commerce, m-commerce, or social commerce channel) can log into account 503. Channel 501 can enter new order 511 through account 503. Account 503 can send new order lookup 512 to facade 504. Since a new order modifies state, facade 504 can send enter new order 513 to OMS 506. OMS 506 can store order 521. When the order successful saves, OMS 506 can also synchronize the order with order state cache 505. For example, OMS 605 can push new order 514 asynchronously to order state cache 505. When appropriate a message can also be returned to channel 501 to indicate the order was saved.

Subsequently, kiosk or POS terminal 502 can log into or access account 503. Kiosk or POS terminal 502 can indicate a desire for order information (e.g., where is order request 515) through account 503. The desired order information can include information about new order 511. In response, account 503 can send order list lookup 516 to facade 504 (which is similar to business layer 202). Facade 504 can determine that order list lookup 516 is not configured to impact state. For example, order list lookup 516 can be a request for the status of new order 511. Facade 504 can route corresponding order list lookup 517 to order state cache 505 (which is similar to OMS database cache 204). Thus, facade 504 acts as a proxy to route an order lookup request 517 to order state cache 505 (as opposed to OMS 506).

Order state cache 504 can return order list lookup response 518 to facade 504. Order list lookup response 518 can include the order status of new order 511. In response, facade 504 can send corresponding order list lookup response 519 (also including the order status new order 511) to account 504. Account 504 can indicate the status new order 511 at a (e.g., graphical user) interface (e.g., display customer order list and current state 520).

Figure 6:
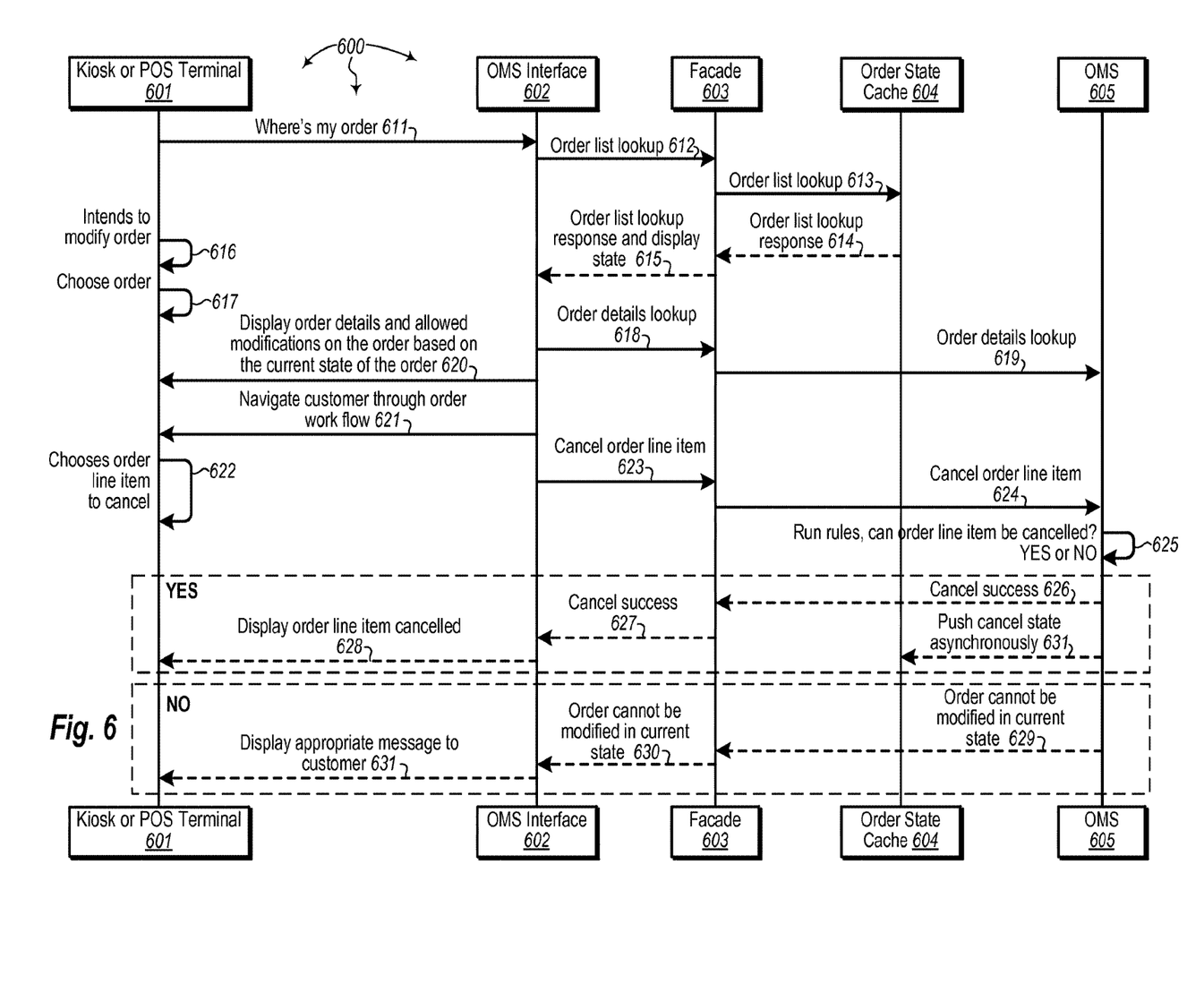
FIG. 6 illustrates a sequence diagram of an example for processing an order line item cancellation from a retail system.

FIG. 6 illustrates a sequence diagram 600 of an example for processing an order line item cancellation from a retail system. Kiosk or POS terminal 601 can log into OMS interface 602. A customer or retail employee (on behalf of a customer) can indicate a desire for order information (e.g., where's my order request 611) through kiosk or POS terminal 601. In response, OMS interface 602 can send order list lookup 612 to facade 603 (which is similar to business layer 202). Facade 603 can determine that order list lookup 612 is not configured to impact state. Facade 603 can route corresponding order list lookup 613 to order state cache 604 (which is similar to OMS database cache 204). Thus, facade 603 acts as a proxy to route an order lookup request to order state cache 604 (as opposed to a corresponding OMS database).

Order state cache 604 can return order list lookup response 614 to facade 603. Order list lookup response 614 can include the order status of one of the customer's orders. In response, facade 603 can send corresponding order list lookup response 615 (also including the order status the customer's order) to OMS interface 602. The customer or retail employee can indicate an intent to modify an order and choose the order (e.g., intends to modify order 616 and choose order 617) through kiosk or POS terminal 601.

In response, OMS interface 602 can send order details lookup 618 to facade 603. Since order details lookup 618 is associated with an intent to modify an order (and thus change state), facade 603 routes corresponding order details lookup 619 to OMS 605 (which is similar to OMS database 203). OMS interface 602 can display order details and allowed modifications on the customer's order based on the current state of the order 620 at kiosk or POS terminal 601. OMS interface 602 can also navigate the customer through an order modification flow at kiosk or POS terminal 601. The customer can choose an order line item from the order to cancel 622. In response, OMS interface 602 can send cancel order line item 623 to facade 603. Since cancel order line item 623 is associated with an intent to cancel a line item (and thus change state), facade 603 routes corresponding cancel order line item 624 to OMS 605.

OMS 605 runs rules to determine if the line item can be canceled 625. If rules indicate that the line item can be canceled (YES), OMS 605 sends cancel success 626 to facade 603. Facade 603 in turn indicates can cancel success 627 to OMS interface 602. OMS interface 602 then displays the order line item as canceled 628 at kiosk or POS terminal 601. When the order line item is successfully canceled, OMS 605 can also synchronize the order line item cancellation with order state cache 604. For example, OMS 605 can push cancel state 631 asynchronously to order state cache 604.

If rules indicate that the line item cannot be canceled (NO), OMS 605 returns order cannot be modified in current state 628 to facade 603. In turn, facade 603 returns order cannot be modified in current state 629 to OMS interface 602. OMS interface 602 displays an appropriate message 630 at kiosk or POS terminal 601.

Figure 7:
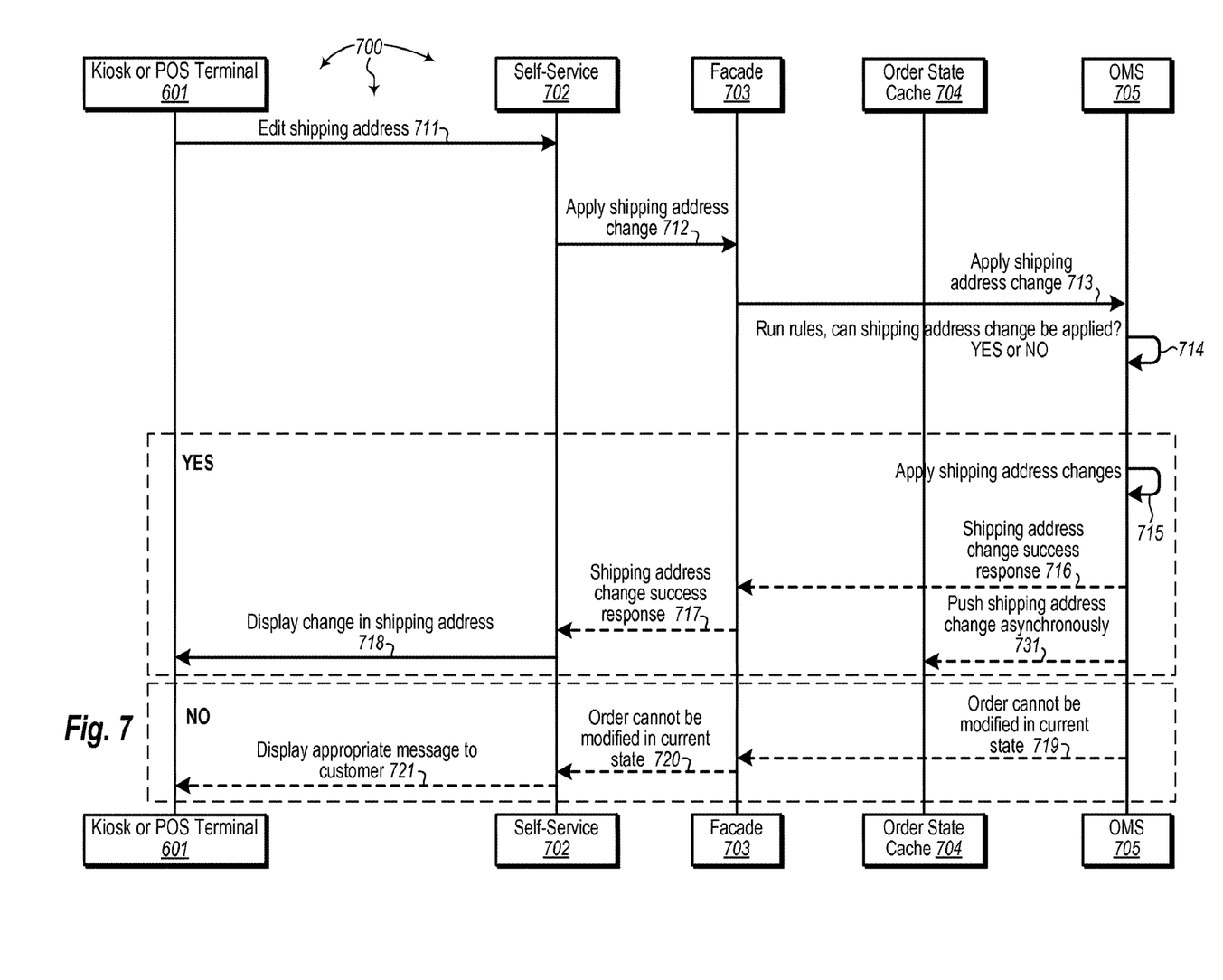
FIG. 7 illustrates a sequence diagram of an example for processing a shipping address change from a retail system.

FIG. 7 illustrates a sequence diagram of an example for processing a shipping address change from a retail system. Kiosk or POS terminal 701 can enter shipping address 711 to OMS interface 702. OMS interface 702 can send apply shipping address change 712 to facade 703 (which is similar to business layer 202). Since apply shipping address change 712 is associated with an intent to modify an order (and thus change state), facade 703 routes corresponding apply shipping address change 713 to OMS 705 (which is similar to OMS database cache 204). OMS 705 implements rules 714 to determine if the shipping address change can be applied.

If rules indicate that the shipping address can be changed (YES), OMS 705 applies the shipping address change 715. OMS 705 sends shipping address change success response 716 to facade 703. In turn, facade 703 sends shipping address change success response 717 to OMS interface 702. OMS interface 702 displays the change in shipping address 718 to a customer at kiosk or POS terminal 701. When the shipping address is successfully changed, OMS 705 can also synchronize the shipping address change with order state cache 704. For example, OMS 705 can push shipping address change 731 asynchronously to order state cache 704.

If rules indicate that the shipping address cannot be changed (NO), OMS 705 returns order cannot be modified in current state 719 to facade 703. In turn, facade 703 returns order cannot be modified in current state 720 to OMS interface 702. OMS interface 702 displays an appropriate message 721 to the customer at kiosk or POS terminal 701.

Other calls can also be made to recompute LOS, shipping, inventory, price, taxes, etc.

A number of embodiments include a system can include one or more processors and one or more non-transitory computer-readable media storing computing instructions configured to run the one or more processors. The system can include one or more customer orders from an order database. An order database can be communicatively coupled to an order database cache comprising order data that can be synchronized from the order database. One or more in-store retail system channels can modify an order state of one or more customer orders from the order database. An order lookup from an in-store retail system channel of one or more in-store retail system channels can indicate a database command type. A database command type can impact a state of the order database that can indicate a modification to order data. A data source can service the order lookup based on at least a timestamp of the order data associated with a customer order. Responsive to determining the data source, the order lookup can be routed to the data source. The database command type of the order lookup can impact the state of the order database. A data indicator of the order data in the order lookup can be modified when the database command type impacts the state of the order database.

Various embodiments include a method being implemented via execution of computer instructions configured to run at one or more processors and stored at one or more non-transitory computer-readable media. The method can receive one or more customer orders from an order database when the order database is communicatively coupled to an order database cache. Order data can be synchronized from the order database cache to the order database. An order database can be communicatively coupled to one or more in-store retail system channels that can modify an order state of one or more customer orders from the order database. An order lookup can be received from an in-store retail system channel of one or more in-store retail system channels and can indicate a database command type. A database command type can impact a state of the order database when the order data is modified. A data source can service the order lookup based on at least a timestamp of the order data associated with a customer order. Responsive to determining the data source, the order lookup can be routed to the data source. The database command type of the order lookup can impact the state of the order database. A data indicator of the order data in the order lookup can be modified when the database command type impacts the state of the order database.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed is:

1. A system comprising:
   one or more processors; and
   one or more non-transitory computer-readable media storing computing instructions configured to run the one or more processors to perform:
   receiving one or more customer orders from an order database, the order database communicatively coupled to an order database cache comprising order data synchronized from the order database, the order database communicatively coupled to one or more in-store retail system channels that can modify an order state of the one or more customer orders from the order database;

receiving an order lookup from an in-store retail system channel of the one or more in-store retail system channels, the order lookup indicating a database command type;

determining whether the database command type impacts a state of the order database comprising a modification to the order data;

determining a data source to service the order lookup based on at least a timestamp of the order data associated with a customer order of the one or more customer orders;

responsive to determining the data source, routing the order lookup to the data source;

determining whether the database command type of the order lookup will impact the state of the order database; and modifying a data indicator of the order data in the order lookup when the database command type impacts the state of the order database.

2. The system of claim 1, wherein:

receiving the order lookup from the in-store retail system channel of the one or more in-store retail system channels further comprises receiving the order lookup from at least one of:
a retail kiosk channel; or
a Point-Of-Sale (POS) terminal channel.

3. The system of claim 2, wherein:

the one or more in-store retail system channels comprise:
an electronic commerce channel;
a mobile commerce channel; or
a social commerce channel; and receiving the order lookup from the in-store retail system channel further comprises:
receiving the order lookup for the order data that was previously entered into the order database through at least one of:
the electronic commerce channel;
the mobile commerce channel; or
the social commerce channel.

4. The system of claim 2, wherein:

determining the data source to service the order lookup for the order data that was previously entered into the order database through at least one of:
an electronic commerce channel of the one or more in-store retail system channels;
a mobile commerce channel of the one or more in-store retail system channels; or
a social commerce channel of the one or more in-store retail system channels.

5. The system of claim 1, wherein the computing instructions are further configured to run the one or more processors to perform:

viewing data from the order data when the database command type does not impact the state of the order database; and
wherein:
determining the data source to service the order lookup further comprises determining that the order database cache is to service the order lookup; and
routing the order lookup to the data source further comprises routing the order lookup to the order database cache.

6. The system of claim 1, the computing instructions are further configured to run the one or more processors to perform:

receiving a portion of the order data back from the data source by at least receiving a portion of JavaScript Object Notation ("JSON") formatted order data back from the order database cache.

7. The system of claim 1, wherein:

determining whether the database command type impacts the state of the order database further comprises adding or deleting a portion of the order data;
determining the data source to service the order lookup further comprises determining that the order database is to service the order lookup; and
routing the order lookup to the data source further comprises routing the order lookup to the order database.

8. The system of claim 1, wherein the computing instructions are further configured to run the one or more processors to perform:

receiving a portion of the order data back from the data source by at least receiving a portion of relational database management system ("RDBMS") formatted order data back from the order database.

9. The system of claim 1, wherein the computing instructions are further configured to run the one or more processors to perform:

returning a portion of the order data to the in-store retail system channel by at least returning a list of order numbers to the in-store retail system channel.

10. The system of claim 1, wherein the computing instructions are further configured to run the one or more processors to perform:

receiving an other order lookup from the in-store retail system channel, the other order lookup requesting additional order detail for an order number included in the list of order numbers.

11. A method being implemented via execution of computer instructions configured to run at one or more processors and stored at one or more non-transitory computer-readable media, the method comprising:

receiving one or more customer orders from an order database, the order database communicatively coupled to an order database cache comprising order data synchronized from the order database, the order database communicatively coupled to one or more in-store retail system channels that can modify an order state of the one or more customer orders from the order database;

receiving an order lookup from an in-store retail system channel of the one or more in-store retail system channels, the order lookup indicating a database command type;

determining whether the database command type impacts a state of the order database comprising a modification to the order data;

determining a data source to service the order lookup based on at least a timestamp of the order data associated with a customer order of the one or more customer orders;

responsive to determining the data source, routing the order lookup to the data source;

determining whether the database command type of the order lookup will impact the state of the order database; and modifying a data indicator of the order data in the order lookup when the database command type impacts the state of the order database.

12. The method of claim 11, wherein:
receiving the order lookup from the in-store retail system channel comprises receiving the order lookup from at least one of:
 a retail kiosk channel; or
 a Point-Of-Sale (POS) terminal channel.

13. The method of claim 12, wherein:
the one or more in-store retail system channels comprises:
 an electronic commerce channel;
 a mobile commerce channel; and
 a social commerce channel; and
receiving the order lookup from the in-store retail system channel further comprises:
 receiving the order lookup from the in-store retail system channel further comprises receiving the order lookup for the order data that was previously entered into the order database through at least one of:
  the electronic commerce channel;
  the mobile commerce channel; or
  the social commerce channel.

14. The method of claim 12, wherein:
determining the data source to service the order lookup further comprises determining the data source to service the order lookup for the order data that was previously entered into the order database through at least one of:
 an electronic commerce channel of the one or more in-store retail system channels;
 an mobile commerce channel of the one or more in-store retail system channels; or
 an social commerce channel of the one or more in-store retail system channels.

15. The method of claim 11, wherein:
determining whether the database command type impacts the state of the order database further comprises adding or deleting a portion of the order data.

16. The method of claim 15, wherein:
determining the data source to service the order lookup further comprises determining that the order database is to service the order lookup; and
routing the order lookup to the data source further comprises routing the order lookup to the order database.

17. The method of claim 11, further comprising:
viewing data from the order data when the database command type does not impact the state of the order database.

18. The method of claim 11, wherein:
determining the data source to service the order lookup further comprises determining that the order database cache is to service the order lookup; and
routing the order lookup to the data source further comprises routing the order lookup to the order database cache.

19. The method of claim 11, further comprising:
returning a portion of the order data to the in-store retail system channel comprising returning a list of order numbers to the in-store retail system channel.

20. The method of claim 11, further comprising:
receiving an other order lookup from the in-store retail system channel, the other order lookup requesting additional order detail for an order number included in the list of order numbers.

* * * * *